United States Patent Office 3,682,591
Patented Aug. 8, 1972

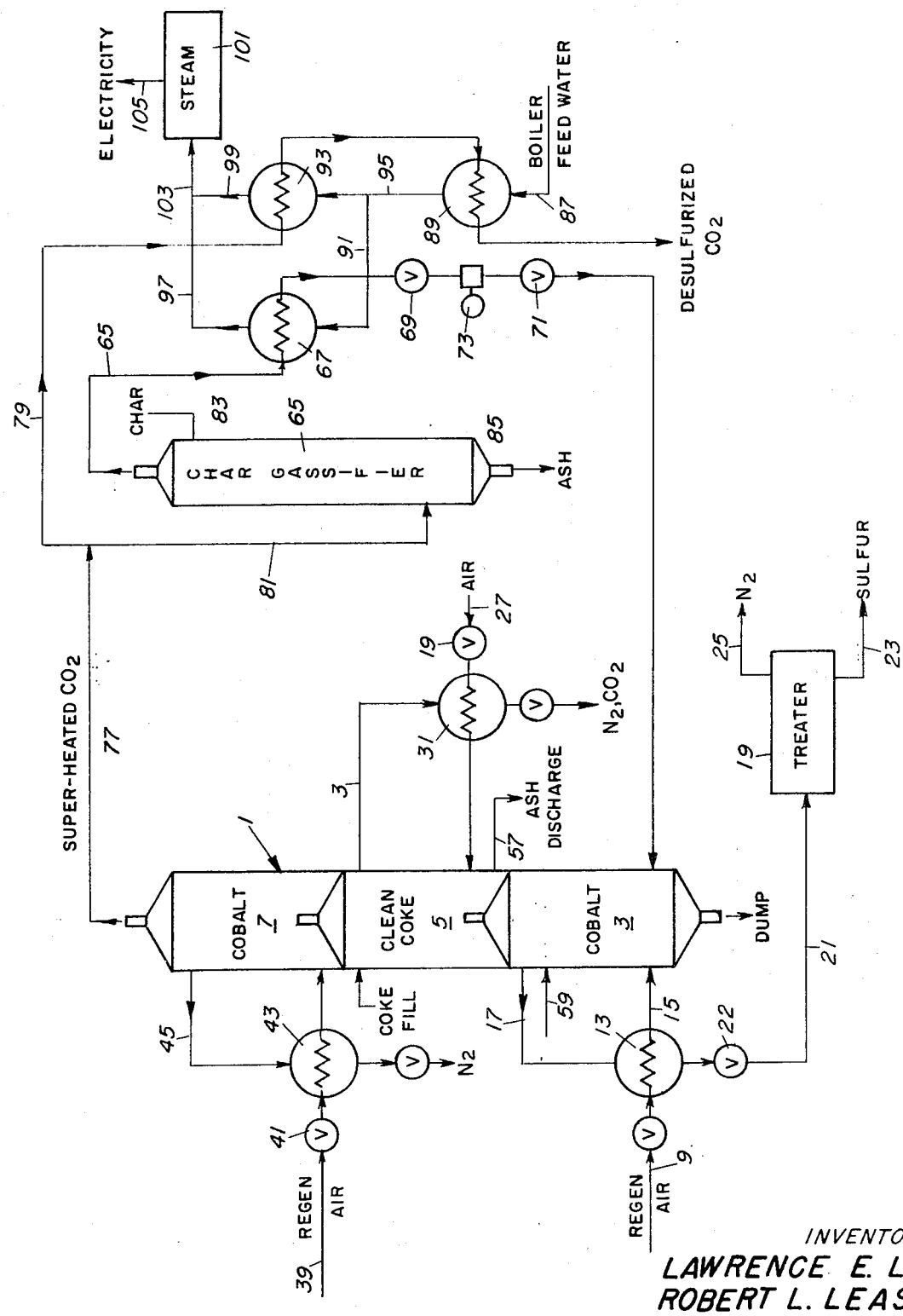

3,682,591
GASIFIER AND DESULFURIZER
Lawrence E. Leas, Simi, Calif., and Robert L. Leas and Cecil J. Johnson, Columbia City, Ind., assignors to Leas Brothers Development Corporation, Columbia City, Ind.
Filed Jan. 12, 1970, Ser. No. 2,452
Int. Cl. C10j 3/04; C01b 31/20
U.S. Cl. 423—437
6 Claims

ABSTRACT OF THE DISCLOSURE

The present invention relates to methods and apparatus for gasifying and desulfurizing char, coke and/or coal by the use of cobalt or similar reactive oxides with the use of air as the regenerative fluid. The methods generate superheated carbon dioxide which in turn gasifies carbon to carbon monoxide. The higher oxide cobalt absorbs (chemically combines) the sulfur gases on the char gasifying cycle. Air then regenerates the cobalt. The sulfur gases are removed in a concentrated stream by a novel alcohol absorbtion sulfur recovery unit. As the air is regenerating the sulfur bearing cobalt bed, it is also reheating the clean coke bed and the top cobalt bed. Excess heat is used to generate steam and electricity. The ash is removed as a separate product. The heat exchange circuits are arranged to maximize heat recovery and thermal efficiency. The process is automated to minimize operating labor costs and to improve safety.

---

While the prior art knows of many ways to gasify carbon and desulfurize the products therefrom, heretofore, complexity and economics were unfavorable to the point that commercialization has not been profitable. Some gasification pilot plants have been developed and operated wherein hydrogen converts the carbon to methane even though the chemical and petroleum industries do the opposite in breaking down methane to hydrogen and even though both processes are very expensive to operate. In the prior art, coal-steam-electric plants burn high sulfur coal and discharge all the sulfur dioxide and fly ash to the surrounding environment which is injurious to pepole, animals, plant life and to industrial and commercial equipment. Likewise, both coal-steam-electric and nuclear-steam-electric plants cause excessive thermal water pollution problems.

In many prior art processes, coal is consumed in its raw state for fuel thereby wasting the premium valued coal liquid products and chemicals. Past research and development have contributed processes that produce considerable coal char residue and burning of these chars has been inefficient resulting in polluting the air with sulfur dioxide, fly ash, and nitrogen dioxide. In many prior art processes, several stack gas treating processes have been developed and piloted even though the processes are inefficient and costly to commercialize. Governmental controls and regulations have been delayed in decreasing air and water pollution because the technology and remedy treatments that were proposed were inefficient and too costly. Natural gas has replaced high sulfur coal and fuel oil firing to minimize air pollution even though the United States is losing reserves of natural gas faster than new ones are discovered. It has heretofore been mandatory that large volumes of imported crude oil be used in the United States even though large domestic reserves of coal are present.

An important object of the present invention is to overcome the problems and inadequacies pointed out above. Another object of the present invention is to remove the sulfur from the coal char and other carbon residuals without complete combustion, absorb the sulfur on metal oxides, and then in a separate cycle remove the sulfur gases in a more concentrated form wherein recovery of sulfur is less expensive and more complete.

Another objective of the present invention is to generate steam from char or carbon residuals through high temperature heat exchange and thereby eliminating fly ash, sulfur dioxide and nitrogen oxide air pollution. Another objective of the present invention is to use cobalt oxide and other similar reactive metal oxides to absorb sulfur gases and to superheat carbon dioxide for coke gasification to carbon monoxide.

A further objective of the present invention is to locate three or more beds in series flow so as to use the first bed of cobalt oxide to absorb and/or to eject the sulfur gases and to superheat carbon dioxide for carbon gasification in the second bed of coke and for oxidation of said carbon monoxide in the third bed of cobalt oxide to further increase the temperature of the superheated carbon dioxide.

A still further object of the present invention is to use just enough regeneration air to release the sulfur from the sulfided cobalt to facilitate the better and more complete recovery of the sulfur as a separate product. An object of the present invention is to have single or multi-parallel trains of series flow beds to make the process either intermittent or continuous in operation. Another object of the present invention is to charge the fluidized coke or char into the beds intermittently or continuously as desired with pressurized inert gases, i.e., carbon dioxide from the process. An object of the present invention is to produce a desulfurized and purified carbon dioxide product for chemical feed stocks or for inerting purposes. Yet another object of the present invention is to separate and recover oxygen from air and to use this oxygen more effectively within the process. Another object of the present invention is to integrate each of the process units or beds into a sequence and at the optimum loading to balance the demand and supply of char, coke and heat generation to accommodate different sulfur levels and gasification requirements.

These and other objects of the invention will become more apparent to those skilled in the art by reference to the following detailed description when viewed in light of the accompanying drawings wherein:

The drawing illustrates a schematic of the process of this invention.

Referring now to the drawing, a carbon dioxide generator for char gasification is designated as column 1. This column contains three stacked units separated by inverted coned shaped baffles which restrict the flow of solids between the zones but during the production of $CO_2$ allows the upward flow of gas between the stacked sections or zones. The sections are arranged so that a metal oxide bed (in this description referred to as a cobalt oxide bed but other metal or lower metal oxides can be used provided their oxidation reactions and dissociation reactions are within the range of temperature and pressure of interest for this invention) is on the bottom of column 1 and designated as 3. A clean coke section 5 is in the middle section and another cobalt oxide bed 7 is in the top section. During the oxidation cycle, the lower cobalt oxide is oxidized to the higher oxide form and the cobalt sulfides formed from the previous cycle are reacted with oxygen to sulfur dioxide and is removed from the bed. This step takes place in bed 3 by air from line 9 and valve 11 which is heated in exchanger 13 and sent to the bottom of the bed 3 via line 15. The reactions described above take place and the oxygen depleted air and sulfur dioxide leave the top of bed 3 via line 17 where it provides heat to the incoming air in exchanger 13 and sent to a treater 19, through line 21 and valve 22.

In the treater 19, the sulfur is recovered through line 23 and the nitrogen is vented through line 25. In addition, the coke bed 5 is heated by air from line 27, valve 29 and exchanger 31 wherein part of the coke is burned with the air and exits the top of bed 5 via line 33 and heats the incoming air in exchanger 31.

The gases are vented through line 35 and valve 37, since no detrimental contaminants are in this stream. Likewise, cobalt oxide bed 7 is being oxidized to its higher oxide form by air from line 39, valve 41 and exchanger 43. The oxygen depleted air (mainly nitrogen) is vented through line 47 and valve 49. By controlling the pressure inside the three beds, flow of gases between the beds is eliminated. After the oxidation step is completed, all three beds are hot and the alternate cycle is initiated. Bed 7 is filled with oxide and emptied as needed via lines 51 and 53, respectively. Bed 5 is filled with coke and the ash is discharged via lines 55 and 57, respectively. Bed 3 is filled with oxide and emptied as needed via lines 59 and 61, respectively. During the alternate cycle, carbon monoxide and some sulfur dioxide (present due to the sulfur content of the char) present from the previous cycle and maintained in the gasifier 63 (the gasifier is used somewhat as a CO surge tank between cycles) is compressed from line 65, exchanger 67, valves 69 and 71, and compressor 73 through line 75 to the higher oxide bed 3 (which has been oxidized from the previous cycle).

In above cycle, valves 41, 49, 29, 37, 11 and 22 are closed downstream of the heat exchangers. Therefore, any problem connected with valving at the high temperatures involved, is diminished. In this bed and during this cycle, the carbon monoxide reduces the metal oxide to the lower oxide form and the sulfur dioxide reacts with the cobalt oxide to cobalt sulfides. The reactions are exothermic and this superheats the carbon dioxide formed by the reaction: $Co_3O_4 + CO \rightarrow 3CoO + CO_2 +$ heat. The heated $CO_2$ flows upward and gasifies the coke in bed 5 to additional CO. The gases continue their upward flow into bed 7 where the CO reacts with the higher oxide and further superheats the $CO_2$. The superheated $CO_2$ leaves the top of column 1 via line 77 where part of the $CO_2$ is sent to a steam generator via line 79. This prevents build-up of gaseous products within the unit. The rest of the superheated $CO_2$ is sent to gasifier 63 through line 81 where gasification of the char, entering from line 83, to carbon monoxide takes place. The ash residue leaves the gasifier via line 85. The char contains some sulfur and this sulfur forms mainly sulfur dioxide. The $CO_2$ along with the carbon monoxide leaves the gasifier through line 65 and is sent to the cobalt oxide bed 3 as previously described. Boiler feed water for steam generation enters via line 87 where it is preheated by the tail end of the stack gases in exchanger 89. Part of the preheated water is sent to exchanger 67 via line 91 where steam is generated. The rest of the water produces steam in generator 93, via line 95, from the split stream of $CO_2$ from line 79. Steam from exchanger or steam generator 67 leaves via line 97 and is joined with steam from generator 93 exiting via line 99. The combined steam is sent to a steam turbine, 101, via line 103 to produce electricity, 105. The $CO_2$ from line 79 is used as heat for the steam generator 93 and then flows through line 105 to preheat the water in exchanger 89 and is then vented via line 107, or used for other processes as required.

Because the process of the present invention for gasifying and desulfurizing char, coke, or coal is so very flexible to accommodate the many varied quality residual carbons and sulfur levels, the operating variables can be changed over a wide spectrum without decreasing the scope and spirit of this present invention.

Having illustrated the present invention by the above description and drawing, I claim:

1. A continuous method for the gasifying and desulfurizing of char, coke and coal and for the production of desulfurized superheated carbon dioxide which comprises in step (A) in a first zone, in a reduction stage, said first zone containing cobalt oxide in a higher valence state, feeding to said first zone a gaseous composition comprising carbon monoxide and sulfur oxides obtained from a previous cycle, exothermically reacting said carbon monoxide and said sulfur oxides with said higher valence state cobalt oxide to produce lower valence cobalt oxides, hot carbon dioxide and metal sulfides;

passing said hot carbon dioxide into a second zone containing coke to gasify said coke and produce additional carbon monoxide;

passing the gaseous mixture of hot carbon dioxide and carbon monoxide into a third zone containing a cobalt oxide in a higher valence state, reacting said gaseous mixture with said higher valence stage cobalt oxide in an exothermic reaction to produce additional carbon dioxide in a superheated state and lower valence cobalt oxide;

removing said superheated carbon dioxide from said third zone;

passing a portion of said superheated carbon dioxide to a gasifier containing a carbonaceous material, gasifying said carbonaceous material to produce carbon monoxide and sulfur oxides, cycling said carbon dioxide, carbon monoxide and sulfur oxides to said first zone;

and, following the removal of the superheated carbon dioxides from said third zone in step (A) and prior to the cycling of carbon dioxide, carbon monoxide and sulfur oxides from the carbonaceous material gasifier to said first zone;

in step (B) in said first zone, in an oxidation stage, oxidizing the cobalt oxide in the lower valence state to a higher valence state by contacting said cobalt oxide with an oxygen-containing gas at elevated temperatures, removing residual sulfur therefrom;

in said second zone, recharging fresh coke;

in said third zone, oxidizing the cobalt oxide in the lower valence state to a higher valence state by contacting said cobalt oxide with an oxygen-containing gas at elevated temperatures, and repeating steps (A) and (B) on a cyclic, continuous basis.

2. A method in accordance with claim 1 wherein a portion of the superheated carbon dioxide is used to generate steam.

3. A method in accordance with claim 1 wherein the coke and/or char is injected intermittently or continuously by the use of a fluidized inert gas or carbon dioxide from the process.

4. A method in accordance with claim 1 wherein the oxygen-containing gas is air.

5. A method in accordance with claim 1 wherein the metal oxide is cobalt oxide, and zones one, two and three are in series, whereby carbon monoxide is oxidized to carbon dioxide by said cobalt oxide and the coke in the second zone is gasified with the superheated carbon dioxides to carbon monoxide.

6. A method in accordance with claim 5 wherein the cobalt oxide yields oxygen in the carbon monoxide cycle to produce superheated carbon dioxide and the lower valence cobalt oxide in the oxidation cycle absorbs oxygen, releasing absorbed sulfur exothermically.

References Cited

UNITED STATES PATENTS 3,415,634  12/1968  Dent et al. _____ 48—197 X
3,506,309  4/1970   Von Hippel _____ 299—2
2,665,971  1/1954   Lewis et al. _____ 23—150

JOSEPH SCOVRONEK, Primary Examiner
R. E. SERWIN, Assistant Examiner

U.S. Cl. X.R.
23—260, 284